US010119094B2

(12) United States Patent
Barth et al.

(10) Patent No.: US 10,119,094 B2
(45) Date of Patent: Nov. 6, 2018

(54) ANTIFRICTION COATING

(71) Applicant: Dow Corning Corporation, Midland, MI (US)

(72) Inventors: Marita Barth, Ingelheim (DE); Vittorio Clerici, Oestrich-winkel (DE)

(73) Assignee: Dow Silicones Corporation, Midland, MI (US)

( * ) Notice: Subject to any disclaimer, the term of this patent is extended or adjusted under 35 U.S.C. 154(b) by 0 days.

(21) Appl. No.: 15/105,943

(22) PCT Filed: Dec. 18, 2014

(86) PCT No.: PCT/EP2014/078472
§ 371 (c)(1),
(2) Date: Jun. 17, 2016

(87) PCT Pub. No.: WO2015/091802
PCT Pub. Date: Jun. 25, 2015

(65) Prior Publication Data
US 2016/0319211 A1 Nov. 3, 2016

(30) Foreign Application Priority Data
Dec. 18, 2013 (GB) .................................. 1322453.0

(51) Int. Cl.
*C10M 169/04* (2006.01)
*C08G 59/22* (2006.01)
*C08G 59/62* (2006.01)
*C09D 163/00* (2006.01)
*C09D 161/06* (2006.01)
*B05D 1/02* (2006.01)
*B05D 1/18* (2006.01)
*B05D 1/00* (2006.01)
*F16B 1/00* (2006.01)

(52) U.S. Cl.
CPC ......... *C10M 169/047* (2013.01); *C08G 59/22* (2013.01); *C08G 59/621* (2013.01); *C09D 161/06* (2013.01); *C09D 163/00* (2013.01); B05D 1/005 (2013.01); B05D 1/02 (2013.01); B05D 1/18 (2013.01); C10M 2201/062 (2013.01); C10M 2201/065 (2013.01); C10M 2201/066 (2013.01); C10M 2209/103 (2013.01); C10M 2213/062 (2013.01); C10M 2213/0623 (2013.01); C10M 2217/0446 (2013.01); C10M 2223/042 (2013.01); C10M 2229/02 (2013.01); F16B 2001/0021 (2013.01)

(58) Field of Classification Search
CPC ............ C10M 119/24; C10M 169/047; C10M 2201/065; C10M 2201/066; C10M 2209/103; C10M 2213/062; C10M 2213/0623; C10M 2217/0446; C10M 2229/02; B05D 1/005; B05D 1/02; B05D 1/18; F16B 2001/0021
See application file for complete search history.

(56) References Cited

U.S. PATENT DOCUMENTS

| 2004/0224856 | A1* | 11/2004 | Saiki ................... | C09D 179/08 508/108 |
| 2011/0165331 | A1* | 7/2011 | Barth ..................... | B05D 5/08 427/406 |
| 2012/0101011 | A1* | 4/2012 | Makino ................ | C10M 125/00 508/100 |
| 2012/0103183 | A1* | 5/2012 | Jung .................... | C09D 161/06 92/172 |
| 2013/0130953 | A1* | 5/2013 | Spagnoli .............. | C10M 115/08 508/136 |
| 2013/0330387 | A1* | 12/2013 | Ou-yang ............... | A61L 29/085 424/411 |

FOREIGN PATENT DOCUMENTS

| CN | 1621464 A | * | 6/2005 |
| CN | 101067065 A | | 11/2007 |
| CN | 101074342 A | | 11/2007 |
| CN | 100513498 C | | 7/2009 |
| CN | 101974282 A | | 2/2011 |
| CN | 103709808 A | | 4/2014 |
| EP | 0976795 A2 | | 2/2000 |
| WO | WO2009138471 A1 | | 11/2009 |

OTHER PUBLICATIONS

English language abstract and machine translation for CN103709808 (A) extracted from http://worldwide.espacenet.com database on Nov. 10, 2016, 5 pages.
English language abstract and machine translation for CN100513498 (C) extracted from http://worldwide.espacenet.com database on Nov. 10, 2016, 10 pages.
PCT/EP2014/078472 International Search Report dated Mar. 25, 2015, 4 pages.
English language abstract and machine translation for CN1621464 (A) extracted from https://patents.google.com database on Jun. 17, 2016,9 pages.
English language abstract and machine translation for CN101067065 (A) extracted from http://worldwide.espacenet.com database on Jun. 14, 2016,10 pages.
English language abstract and machine translation for CN101074342 (A) extracted from http://worldwide.espacenet.com database on Jun. 14, 2016, 9 pages.
English language abstract and machine translation for CN101974282 (A) extracted from http://worldwide.espacenet.com database on Jun. 14, 2016, 20 pages.

* cited by examiner

*Primary Examiner* — James C Goloboy

(74) *Attorney, Agent, or Firm* — Warner Norcross & Judd LLP

(57) ABSTRACT

An antifriction coating composition which comprises: a resin binder, a polyamide thickener, solvent and a solid lubricant wherein the resin binder comprises a mixture of phenolic resin, epoxy resin and optionally a silicone resin.

18 Claims, No Drawings

ANTIFRICTION COATING

CROSS-REFERENCE TO RELATED APPLICATIONS

This application is the National Stage of International Application No. PCT/EP2014/078472 filed on 18 Dec. 2014, which claims priority to and all advantages of United Kingdom (GB) Application No. 1322453.0 filed on 18 Dec. 2013, the content of which is hereby incorporated by reference.

The present invention relates to an anti-friction coating comprising a polymeric resin, a lubricant, and a solvent which provides a dry lubrication system for steel and/or aluminium surfaces, particularly fasteners used in industrial and automotive applications such as, for example, engine fasteners.

Metal parts such as fasteners must be lubricated prior to use. The current industrial standard process for coating these metal parts is a combination of pre-treatment of the metallic surfaces followed by application of a lubricating film. A wide variety of pre-treatment processes may be used. The one selected is typically determined by the nature of the substrate being treated and by the level of corrosion protection needed. For example: for phosphating pre-treatments an oil or wax-film is applied subsequent to phosphating for reaching the required lubrication. Similarly, for pre-treatments using zinc (Zn)-flake coatings or galvanic layers wax-films or top coats containing solid lubricants are applied to reach the requested lubrication performance. Of these the most common pre-treatment of the metal parts is by phosphating the metal part and then, as the resulting "phosphated" layer alone does not provide sufficient lubrication for the part, applying an oil/wax layer to provide a fluid/wet lubrication system for the parts treated.

"Phosphating", the application of phosphate coatings, is a traditional pre-treatment process used on metal surfaces, especially steel, aluminium and zinc. Phosphate coatings are usually applied, for corrosion resistance, and to a very limited extent, lubricity and/or as a foundation (improving adhesion for instance) for subsequent coatings of the aforementioned oils, waxes or alternative coatings. Phosphate coatings are applied in the form of dilute manganese phosphate, and/or zinc phosphate solutions in phosphoric acid, typically by immersion or spraying methods on to the required metal substrate. Chemical interaction between the metal substrate surface and the solution results in dissolved salt(s) being precipitated out and deposited on the metal surface. As previously indicated the resulting phosphate deposition on the metal surface provides a limited degree of corrosion resistance and lubrication necessitating the need for additional layers of oils and/or waxes to be applied onto the phosphate substrates in order to provide the necessary level of lubrication for the substrate.

In the case of fasteners such as engine fasteners the combination of pre-treatment followed by the application of an oil and/or wax layer have a number of disadvantages which the industry has failed to overcome, including for example:

- inconsistent corrosion protection (e.g. after 8 and/or 16 Hours (h) in standard salt-spray tests);
- the oil/wax film spreads away from the surface of fasteners generating scatter (inconsistency) of coefficient of friction (COF);
- the oil/wax film soils the fingers of operators;
- the oil/wax film soils assembly equipment (e.g. feeding lines and fastener; tightening devices etc) used during the assembly of machines etc using fasteners treated with said oils and waxes;
- the oil/wax film tends to pick up dust which can lead to additional problems during assembly processes or thereafter;
- phosphating layers may induce hydrogen embrittlement on hardened steels used for manufacturing fasteners (for classes>10.9).

It has now been identified that the above issues can be significantly reduced or eliminated by replacing the above fluid/wet lubricating systems with dry lubricating antifriction coatings as described here below.

Accordingly there is provided an antifriction coating which comprises:
(i) a resin binder,
(ii) a polyamide thickener,
(iii) solvent and
(iv) a solid lubricant
wherein the resin binder comprises a mixture of phenolic resin, epoxy resin and optionally a silicone resin.

Antifriction coatings are well known in the art as high performance dry lubricants offering maintenance-free permanent lubrication under working conditions which conventional lubricants (such as mineral-oil and synthetic greases) cannot withstand, for example in terms of load carrying capacity (LCC), temperature range, adhesion, fretting corrosion protection, and/or chemical resistance. They are applied to a substrate as a thin coating (typically 5 to 20 µm) forming a dry film on the substrate surface by conventional application techniques, such as spraying, dip-spinning (i.e. centrifuging), dipping or brushing, followed by heating to evaporate the solvent and cure the coating. Application of antifriction coatings to substrates is often improved by pre-treatment of the substrate surface, for example by the previously discussed phosphate coatings or alternatively, fine sandblasting, pickling or anodising.

In the present antifriction coating, a resin binder is provided to actuate adhesion and anchorage of the AFC to the substrate. The resin binder (i) comprises a mixture of phenolic resin, epoxy resin, and optionally a silicone resin. Suitable phenolic resins include copolymers of phenol, cresol, alkylphenol and formaldehyde and phenolether resins like alkyl-, aryl- and allylether resol resins; of these phenolether resins such as alkyl-, aryl- and allylether resol resins are preferred.

Any suitable epoxy resin may be utilised, for example copolymers of bisphenol A and epichlorohydrin i.e. diglycidilethers of Bisphenol A (DGEBA). The epoxy resins may have a molecular weight up to 8000 based on gel permeation technology measurements.

The polyorganosiloxane resin is a complex multi-branched material comprising at least two different units chosen from those of formulae $R_3SiO_{0.5}$ (M units), $R_2SiO_{2/2}$ (D units), $RSiO_{3/2}$ (T units) and $SiO_{4/2}$ (Q units), with at least one of these units being a unit T or Q. Each R group may be the same or different and may be linear or branched and is selected from $C_1$-$C_{20}$ alkyl radicals, alternatively $C_1$-$C_{12}$ alkyl radicals or alternatively $C_1$-$C_6$ alkyl radicals such as, for the sake of example, methyl, ethyl, isopropyl, tert-butyl and n-hexyl radicals; $C_2$-$C_6$ alkenyl radicals, such as vinyl and/or hexenyl radicals, phenyl radicals, 3,3,3-trifluoropropyl and hydroxy groups.

Examples of resins that are particularly suitable are DT, MDT and T resins in which T units ($RSiO_{3/2}$) will particularly comprise alkyl or phenyl R groups, typically methyl groups or phenyl groups and when present D units ($R_2SiO_{2/2}$) are present as dimethyl ($Me_2$) D units (each R being methyl), methylphenyl D units (one R being methyl and the other phenyl) or diphenyl D units (each R being a phenyl group).

Hence preferred DT and T resin are those containing the following mole % of Me or Ph containing T units and when present $Me_2$, PhMe, and/or $Ph_2$, containing D units:
T units
from 0 to 45 mol %-Me containing T units; and
from 35 to 100 mol % Ph containing T units;
D units (when present)
from 0 to 40 mol %-$Me_2$ containing D units;
from 0 to 5 mol %-PhMe containing D units;
from 0 to 15 mol %-$Ph_2$ containing D units;
with the total mole % for each composition being 100%. It is to be noted however that up to 5% by weight of R groups linked to the above T and D units may be hydroxyl (—OH) groups.

Preferably, the binder comprises 15 to 50% by weight, alternatively 15 to 40% by weight phenolic resin, 50 to 85% by weight alternatively 55 to 75% by weight epoxy resin, and 0 to 30%, alternatively, when present 10 to 30% by weight silicone resin, to a total of 100% by weight. In relation to binder content 100% by weight as described is the weight of the 2 or 3 ingredients in the binder and excludes solvent in which one or more of the constituents may be supplied.

The composition further contains a thickener (ii) added in an amount sufficient for the composition to reach a predetermined viscosity required to enable proper application of uncured AFC on to a substrate so that the resulting coating on the substrate is within a required thickness range. Surprisingly it was found that polyamide thickeners gave significantly better results than other, perhaps more traditional thickeners for lubricants such as metal soaps, silica, bentone, urea based materials. The polyamide waxes utilized were the products resulting from reactions of long-chain carboxylic acid with a mono- or polyfunctional amines (e.g. alkylenediamines) or with ammonia. For example interactions between long-chain fatty acids with diamines, including,
(i) reaction products of stearic acid or palmitic acid with ethylenediamine;
(ii) Reaction products of alkylenediamines, preferably of ethylenediamine, with linear fatty acids or mixtures of fatty acids, for example tallow fatty acid, coconut fatty acid, stearic acid, palmitic acid, behenic acid, or erucic acid.
(iii) reaction products of alkylenediamine, preferably of ethylenediamine, with 12-hydroxystearic acid, preferably Amide wax C, the reaction product of alkylenediamine, preferably of ethylenediamine, with 12-hydroxystearic acid and with linear fatty acids.

It is the thickener which makes the difference. The amount of thickener and its chemical nature give the consistency wanted.

The composition also requires one or more solid lubricants (and/or pigments) mainly to regulate the coefficient of friction (COF) performance. Any suitable solid lubricant (iii) may be utilized. These include, for the sake of example, Graphite, $MoS_2$, PTFE, Silicone Wax, a solid hydrocarbon wax such as a polyolefin wax, for example micronised polypropylene wax, polyethylene wax, polyamide wax or a mixture of PTFE and polyolefin wax, or molybdenum disulphide, graphite, zinc sulfide or tricalcium phosphate, or a mixture of any two or more of these.

A variety of pigments may be utilized, for example calcium fluoride ($CaF_2$), aluminium trioxide ($Al_2O_3$), Silicon carbide (SiC), silicon nitride ($SiN_4$), titanium carbide (TiC), titanium oxide ($TiO_2$), silicon oxide ($SiO_2$) and other appropriate inorganic powders and mixtures thereof. Other pigments which may be utilised include melamine cyanurate (alone or mixed with a micronized amide wax, polyamide-12 polymer, polyetheretherketone polymers as well as mixtures thereof and with the inorganic materials listed above.

The composition requires a solvent which is provided to dissolve resin (i) and enable application of an uncured AFC on the substrate, e.g. a fastener. Solvents (iv) for use in the antifriction coating as described herein are well known in the art. Suitable solvents for use in antifriction coatings include water, alcohols (e.g. methanol, ethanol, propanol, butanol), ketones (e.g. acetone, methyl ethyl ketone, methyl butyl ketone, cyclohexanone), esters (e.g. butyl acetate), heterocyclic (e.g. N-methylpyrrolidone) and non-heterocyclic aromatic solvents (e.g. toluene, xylene), including mixtures thereof. Preferred solvents for the antifriction coating as described herein are mixtures of alcohols and esters, in a ratio of from 10:90 by weight to 50:50. The solvent is typically present in the composition as hereinbefore described in an amount of from 30 to 80% by weight of the total composition, alternatively 40-80%, alternatively 50-80%, alternatively 65-75% by weight of the total composition. Any suitable combination of alcohols and esters may be utilized such as n-butylacetate and n-butanol or a combination of alcohols, esters and ketones such as a mix of butylacetate, ethanol and methylethylketone; both combinations provide suitable solving ability of the resin binder system (i); whereas the solvent mix butylacetate and n-butanol is preferred in order to obtain a flash-point>23° C.

Optionally, a suitable catalyst may be utilized to accelerate cure of the dry coating on to suitable targets or substrates. Examples of suitable catalysts for this purpose include, phosphoric acid and phenolsulphonic acid.

Antifriction coatings as hereinbefore described may additionally incorporate a variety of compatible additives e.g.:
(i) surface tension additives such as silicone glycols to improve wetting of the coated parts; and
(ii) silane coupling agents such as methyltrimethoxysilane, 1,6-bis(trimethoxysilyl)hexane, (ethylenediaminepropyl) trimethoxysilane, (3-glycidoxypropyl) trimethoxysilane, (3-glycidoxypropyl) triethoxysilane to improve both adhesion of the resin to the substrate and cohesion between solid lubricants and binder system.

In one alternative the antifriction coating composition comprises
(i) 15- to 30% by weight of resin binder (excluding the weight of any solvent in which resin is supplied)
(ii) 1-to 8% by weight of polyamide thickener,
(iii) 50-80% by weight solvent and
(iv) 0.5-15% by weight of one or more solid lubricants
(v) 0-3% by weight of one or more silane coupling agent(s) and optional additives, when present, with the total % weight being 100%.

In another alternative the antifriction coating comprises
(i) 20-25% by weight of the a resin binder (excluding the weight of any solvent in which resin is supplied)
(ii) 2-5% by weight of polyamide thickener,
(iii) 65-75% by weight solvent and
(iv) 1.5-11% by weight of one or more solid lubricants;
(v) 0-2% by weight of one or more silane coupling agent(s) and optional additives, when present, with the total % weight being 100%.

The resin binder in the above compositions comprises
15 to 50% by weight, phenolic resin,
50 to 85% by weight epoxy resin, and
0 to 30%, silicone resin to a total of 100% by weight of the total binder components (excluding any solvent in which one or more of the constituents may be supplied).

Alternatively the resin binder in the above compositions comprises
15 to 40% by weight phenolic resin,
55 to 75% by weight epoxy resin, and
10 to 30% by weight silicone resin to a total of 100% by weight of the total binder components (excluding any solvent in which one or more of the constituents may be supplied).

In any of the above alternatives the antifriction coating comprises a polyamide wax as thickener (ii) and/or a mixture of an ester and an alcohol as solvent (iii) and/or PTFE as solid lubricant (iv). Typically when present the catalyst is a phosphoric acid and when present the coupling agent is a silane.

The antifriction coating according to the present invention can be prepared by mixing the components together using conventional apparatus in any suitable order. For example dissolving resins and introducing the thickener and solid lubricants and other additives if present.

The resulting antifriction coating according to the present invention may be applied to a surface by any conventional application technique, for example brushing, dipping e.g. dip-spinning, and spraying (e.g. by aerosol can). Other common application methods include spraying drums, centrifuges, electrostatic or automatic spraying, printing and roller coating. The chosen method of application will depend upon the shape, size, weight and quantity of items to be coated. Depending on its viscosity and the nature of the substrate surface, the coating composition may be applied onto said substrate several times. The coating thickness has a considerable influence on the service life, coefficient of friction and anti-corrosion properties of the antifriction coating. Hence, the coating thickness should be greater than the roughness of the surface, typically from 5 to 20 µm. Once the surface has been coated with the antifriction coating, it is dried to evaporate the solvent and cure the coating.

The curing process for the composition depends on the nature and/or size of the substrate. For aluminium based substrates the composition is cured in an oven for 10 to 30 minutes at a temperature of between 100° C. and 150° C. For steel based substrates the composition is cured in an oven for 10 to 30 minutes at a temperature of between 150° C. and 200° C.

The cured antifriction coating (dry film) preferably comprises:
In weight %:
5 to 35% of one or more solid lubricants
65 to 92% of resin binder package
1 to 4% of thickener; and
In volume %:
5 to 30% of one or more solid lubricants
65 to 91% of resin binder package
2 to 5% of thickener.

The antifriction coating as hereinbefore described may be used alone and indeed in many applications is suitable for application without the need of pre-treatments such as phosphating layers. However, whilst this is preferred coatings as hereinbefore described are equally utilizable in combination with commercially available coatings and/or surface treatments suitable for increasing the corrosion protection of a steel substrate where required. These might include phosphating layers such as Zn-phosphating layers, Zn-rich coatings (organic resin binder+Zn-pigments of round and flakes form), Zn-flakes base coats (inorganic resin binder+Zn- and Aluminium-pigments in flakes form), Zn-plating (galvanic layer like Zn, Zn—Ni and Zn—Fe) layers, or hot dip Zn-galvanizing layers. To improve adhesion on Zn-plating layers Zn-phosphating may be necessary, depending on the surface characteristics of the plating system. Other types of phosphating layers may be utilized to enhance adhesion. These may include iron phosphating layers and manganese phosphating layers.

There is also provided herein a method for coating a substrate with an antifriction coating, which method comprises optionally pre-treating a substrate to be coated, and coating the substrate with the antifriction coating according to composition as hereinbefore described.

Substrates may be pre-treated prior to coating with an antifriction coating to improve adhesion and life of the antifriction coating. Conventional methods of pre-treatment include degreasing (for example, using solvents or steam), treatment of corroded surfaces by acid or alkali, phosphating, oxalic acid treatment of stainless steel, sandblasting and anodizing with sandblasting a preferred option. Sand blasting cleans the steel of any rust and imperfections, giving a clean surface to coat, as well as adhesion for the antifriction coating to stick to. Alternatively other suitable pre-treatments to improve adhesion include Mn-phosphating and Fe-phosphating.

As previously indicated, one main opportunity for an antifriction coating as provided herein is as a replacement for the combination of phosphating layer+oil/wax film widely used for lubricating engine fasteners as well as fasteners and threaded connections in several other applications in oil-gas, appliances, automotive, and energy equipments, particularly applications where parts are generally pre-treated with conventional pre-treatments like: phosphating, Zn-flakes, galvanic layers (galvanic plating). Specific examples can include, dry permanent lubrication of nuts, bolts and other fasteners; hinges, lock parts, engine fasteners, door stoppers, magnets, running-in aids for engines window guides, seat belt components, brake rotors and drums, gear parts and other transportation industry related parts.

Industry has set specific requirements for lubrication type coatings on engine fasteners:
1) Cured antifriction coatings (AFCs) must provide a dry coating on the fastener (non-soiling);
2) The coefficient of friction (COF) during assembling (tightening) must fall within the range of 0.09-0.15;
3) the AFC must provide transport corrosion protection (i.e. covering the period of transport from the producer to the user)—i.e. must pass an 8 hour duration salt spray test;
4) the fastener must be sand-blasted and/or degreased prior to application of the AFC
5) the maximum curing temperature of the AFC must be: 200° C. for steel substrates and 150° C. for aluminium substrates;
6) the maximum dry film thickness: 10 µm;
7) when cured an AFC must have good adhesion on steel and aluminium alloys (typical for fasteners).

The present invention will now be illustrated by way of example. All percentages are by weight unless otherwise indicated.

In the Tables identifying compositions relied upon for the examples it is to be understood that the resin package used unless otherwise indicated was a mixture of epoxy resin+ phenolic cross-linker+silicone resin in which:

The epoxy resin used was Bisphenol A Diglycidyl Ether Copolymer sold as Epikote® 1007 by Momentive Specialty Chemicals, Houston US;

The phenolic "cross-linker" was A mix of Allylethers of Mono-, Di- and Trimethylolphenols sold as Methylon® 75108 by the Durez Corporation of Addison, Tex.; and The silicone resin was a DT phenyl-methyl silicon resin sold as Dow Corning® 220 Flake Resin by Dow Corning Corporation of Midland Mich.

The solvent used was a mixture of n-butylacetate and n-Butanol in the amounts as indicated in the Tables.

Unless otherwise indicated the thickener used in the examples was a polyamide wax sold as THIXATROL® P220X-MF from Elementis Specialities of Cologne Germany.

As solid lubricants a PTFE wax mixture and a wax were utilized for the sake of example:

The PTFE wax mixture used was a PE-wax modified fluorocarbon sold as Polyfluo® 400XF from Micro Powders, Inc. of Tarrytown, N.Y., USA and the wax utilized in some examples is an optional high melting point modified PP-wax sold as Micropro® 600 also from Micro Powders, Inc. of Tarrytown, N.Y., USA.

Excepting for Examples 6 and 7, all above commercial materials utilized were those commercially available under the relevant Trade Marks during the summer of 2013. In the case of Example 6 and 7 all above commercial materials utilized were those commercially available under the relevant Trade Marks during the summer of 2014.

EXAMPLE 1

In this example it was unexpectedly identified that the use of amide waxes as thickeners rather than industrial standard thickeners were optimum for the composition described herein. Generally for typical Anti-Friction Coating formulations thickening systems like Bentone products are widely used. It was unexpectedly found that the use of polyamide wax based thickeners enhanced the corrosion protection performance of the composition as will be seen below in which Tables 1a and 1b depict the compositions (amounts indicated are weight % of the composition) utilized and Table 1c provides details of the corrosion protection results.

TABLE 1a

| | Formulation | | | | |
|---|---|---|---|---|---|
| | Comp 1 | Comp 2 | Comp 3 | Comp 4 | Comp 5 |
| Butylacetate (solvent) | 46.8 | 48.3 | 48.2 | 50.7 | 52.3 |
| n-butanol (solvent) | 15.0 | 15.5 | 15.5 | 16.3 | 16.8 |
| Epoxy resin (binder) | 14.8 | 15.3 | 16.0 | 16.0 | 15.9 |
| Si-resin (binder) | 4.3 | 4.4 | 4.7 | 4.7 | 4.6 |
| Phenolic resin (binder) | 4.9 | 5.0 | 5.3 | 5.3 | 5.3 |
| Phosphoric acid (catalyst) | 0.3 | 0.3 | 0.3 | 0.3 | 0.2 |
| Thickener | 4.2 $Al_2O_3$ | 4.4 $Al_2O_3$ | 4.6 $Al_2O_3$ | 1.6 Bentone® 38V | 2.2 Bentone® SD-2 |

TABLE 1a-continued

| | Formulation | | | | |
|---|---|---|---|---|---|
| | Comp 1 | Comp 2 | Comp 3 | Comp 4 | Comp 5 |
| Solid lubricant PTFE-wax mix | 9.7 | 6.8 | 5.4 | 5.1 | 1.6 |
| Wax | 0 | 0 | 0 | 0 | 1.1 |
| Total | 100 | 100 | 100 | 100 | 100 |

In Table 1a it will be seen that the thickeners in the prepared antifriction coatings were the traditionally used aluminium trihydroxide and bentone clay type thickeners. BENTONE® 38 V is an organically modified hectorite commercially available from Elementis Specialities of Diegem Belgium and BENTONE® SD-2 is an organic derivative of a bentonite clay.

TABLE 1b

| | Formulation | | | | |
|---|---|---|---|---|---|
| | 1 | 2 | 3 | 4 | 5 |
| Butylacetate | 57.6 | 57.2 | 56.9 | 56.7 | 56.0 |
| n-butanol | 16.3 | 16.2 | 16.1 | 16.0 | 15.9 |
| Epoxy resin | 13.6 | 13.6 | 13.5 | 13.4 | 13.3 |
| Si-resin | 4.0 | 4.0 | 3.9 | 3.9 | 3.9 |
| Phenolic resin | 4.5 | 4.5 | 4.5 | 4.5 | 4.4 |
| Phosphoric acid | 0.2 | 0.2 | 0.2 | 0.2 | 0.2 |
| Polyamide thickener | 1.5 | 2.0 | 2.0 | 3.0 | 4.0 |
| Solid lubricant PTFE-wax mix | 1.4 | 0.9 | 1.4 | 1.4 | 1.4 |
| Wax | 0.9 | 0.9 | 1.5 | 0.9 | 0.9 |

A reference coating was additionally tested. Ref 1 referred to in Table 1c below relates to a commercial AFC Molykote® D-708 from Dow Corning Corporation of Midland Mich. In the case of Ref. 1 however, two coats were applied due to the comparatively low viscosity of the composition (see Table 1c).

The antifriction coating indicated above as formulation 1 in Table 1b was prepared using the following process based on cold blending, using a mixer with stirrer:

The solvents were intermixed. The epoxy resin was then dissolved in the solvent mixture with stirring. The silicone resin was then introduced and thoroughly mixed into the epoxy resin solution resulting from the above, again with stirring. The thickener and solid lubricants were subsequently introduced and mixed into the solution, mix with dissolver After which the phenolic cross-linker and in this case catalyst (phosphoric acid) were introduced and intermixed. All compositions throughout the examples were made using the above methodology. Additives can be introduced into the solvent solution at any time but typically for the above additives were added simultaneously with the introduction of the thickener and lubricant materials or immediately thereafter.

It was found that the polyamide thickener utilized had good compatibility/resistance with the solvent mixture and the resulting uncured coating showed excellent viscosity stability over time. The viscosity of the AFC formulations used in Table 1c was measured in accordance with DIN EN ISO 2431 using ISO Cup 4. All other viscosity measurements of compositions provided in the remaining examples use the same method (unless otherwise indicated).

The coating compositions were applied onto M10 type steel fasteners with ISO 898-1 strength ratings (otherwise known as property classes) of 8.8, 10.9 or 12.9 as tabulated below or otherwise indicated below. In the case of Table 1c the fasteners used were M10 class 8.8 fasteners.

In the case of Table 1c, each coating composition above was applied onto M10 class 8.8 fasteners by dip-spinning after which the resulting anti-friction coating (AFC) was cured on the so treated fasteners for a period of 20 minutes at 200° C. This application process was used for coating all fasteners throughout the examples. It is to be noted however that this coating process was utilized merely for example.

The resulting fasteners coated in the cured AFC as described in Tables 1a and 1b were then tested for corrosion resistance using with method DIN EN ISO 9227 and the of red rust formation after 16 h in salt-spray tester is given in below table 1c in respect of both the thread of the fastener and the head of the fastener. As fasteners are normally handled as bulk goods and therefore exposed to impacts during handling, packaging and transport a procedure has been developed to evaluate the coated fasteners also under this aspect, i.e. under a more rigorous testing. For this a required number of coated fasteners were placed in a cylindrical container (pail) equipped in its inside with stumble traps; the pail was rotated at low rotational speed for a period of 10 minutes and then the coated fasteners were blasted for 2 min with air pressure at 4 bar ($4\times10^5$ Nm$^{-2}$) and then the anti-corrosion properties were determined with method DIN EN ISO 9227 (henceforth this more rigorous testing is referred to as "tumbling"):

TABLE 1c

| Formulation | Viscosity [s] | Coat Thickness (μm) | Corrosion - after 16 hrs (on thread/ on head) [% of area affected by red rust formation] | Corrosion - after 16 hrs (on thread/ on head) after tumbling [% of area affected by red rust formation] |
|---|---|---|---|---|
| Comp 1 | 43 | 5.3 | 6/2 | 14/10 |
| Comp 2 | 46 | 5.4 | 2/0.6 | 7/5 |
| Comp 3 | 42 | 7.6 | 5/1 | 25/14 |
| Comp 4 | 42 | 8.9 | 14/16 | 26/18 |
| Comp 5 | 33 | 4.7 | 5.7/2 | 7/6 |
| 1 | 22 | 2.2 | 4/9 | 6/14 |
| 2 | 24 | 2.8 | 3/6.5 | 8/18 |
| 3 | 24.5 | 2.5 | 0.7/1.1 | 2.0/3.0 |
| 4 | 27 | 2.6 | 1.8/1.8 | 2.6/6 |
| 5 | 42 | 5.1 | 1.1/0.8 | 1.8/2.2 |
| 5 (2) | 38 | 8.6 | 1.1/0.8 | |
| Ref 1 | 14 | 6.1 | 1.0/0.6 | 20/11 |

It is to be noted that the formulations using traditional thickening systems (i.e. Comps 1-5) showed limited corrosion resistance after mechanical damage.

EXAMPLE 2

Reference Materials

Solid lubricants were identified by testing modified versions of solid lubricants normally used for Anti-Friction Coatings. Of these the most common are perhaps $MoS_2$ (Molybdenum disulfide), graphite, PTFE and synthetic waxes.

As references two commercially available AFCs were tested for coefficient of friction COF). The AFCs assessed were Molykote® D-708 (which contains a PTFE based solid lubricant) and Molykote® D-3484 (a $MoS_2$ based AFC).

Sample fasteners were coated as previously described in Example 1 with the following Curing conditions:
Molykote® D-708=20 min @ 200° C.;
Molykote® D-3484=15 min @ 170° C.

The resulting treated fasteners were analysed for their coefficient of Friction (COF) using a Schatz testing machine (type 5413-4504) according to standard ISO 16047. Selected material pairing in the contact of the under head was a steel strip (with hardness and surface treatment as per standard ISO 16047, par. 7.2.2). Bolts of class 8.8 were pre-tensioned with 26 kN on the fastener tester (Schatz test machine) in this example.

The Results are Provided in Table 2 Below:

TABLE 2

| Formulation | Viscosity [s] | Coat Thickness (μm) | $COF_{tot}$ | $COF_{thread}$ | $COF_{head}$ |
|---|---|---|---|---|---|
| Ref 1(a) | 14 | 10.7 | 0.124 (0.043) | 0.183 (0.110) | 0.093 (0.021) |
| Ref 1(b) | 14 | 10.7 | 0.123 (0.051) | 0.177 (0.126) | 0.095 (0.025) |
| Ref 1(c) | 14 | 17.7 | 0.120 (0.061) | 0.183 (0.147) | 0.087 (0.019) |
| Ref 2 | 60 | 5.3 | 0.065 (0.035) | 0.096 (0.090) | 0.049 (0.023) |

Requirements from the Industry are:
Total Coefficient of Friction (COF) range: mean value between 0.09 and 0.15 Scatter (max minus min measured value) of the total COF: 0.03.

The values in Table 2 for COF are mean values from ten samples unbracketed values and scatter values in brackets. In view of the latter it was considered that Ref 2 was showing COFs which were too low and the Ref 1 samples used were showing inadequate lubrication of the threads, inducing a too high scatter of the total COF.

EXAMPLE 3

Given the results in the previous Examples alternative solid lubricants were sought. Formulation 6, 7 and 8 in Table 3a depict formulations containing traditional solid lubricant materials, namely powder 3M® Dyneon™ TF 9205 PTFE a micronized fluorocarbon powder from 3M and Micropro® 600 as hereinbefore described.

TABLE 3a

| | Formulation | | |
|---|---|---|---|
| | 6 | 7 | 8 |
| Butylacetate | 59.34 | 55.78 | 56.52 |
| n-butanol | 15.80 | 15.77 | 15.89 |
| Epoxy resin | 13.29 | 13.23 | 13.37 |
| Si-resin | 3.85 | 3.83 | 3.87 |
| Phenolic resin | 4.41 | 4.37 | 4.43 |
| Phosphoric acid | 0.21 | 0.20 | 0.22 |

TABLE 3a-continued

|  | Formulation | | |
|---|---|---|---|
|  | 6 | 7 | 8 |
| Polyamide thickener | 1.32 | 3.98 | 1.33 |
| Dyneon ® TF-9205 | 0 | 0 | 4.37 |
| Micropro 600 | 1.78 | 2.84 | 0 |
| Total | 100 | 100 | 100 |

Such compositions were then compared with formulations 9 to 14 in Table 3b using the preferred solid lubricants, described above in the introduction to the examples, Polyfluo® 400XF and Micropro® 600 and identified henceforth as "Solid lubricant PTFE-wax mix".

TABLE 3b

|  | Formulation | | | | | |
|---|---|---|---|---|---|---|
|  | 9 | 10 | 11 | 12 | 13 | 14 |
| Butylacetate | 53.41 | 53.82 | 55.28 | 56.06 | 55.39 | 56.57 |
| n-butanol | 15.10 | 15.21 | 15.63 | 15.85 | 16.21 | 16.00 |
| Epoxy resin | 12.67 | 12.77 | 13.12 | 13.30 | 13.14 | 13.44 |
| Si-resin | 3.67 | 3.70 | 3.79 | 3.86 | 3.81 | 3.89 |
| Phenolic resin | 4.21 | 4.25 | 4.35 | 4.42 | 4.36 | 4.46 |
| Phosphoric acid | 0.20 | 0.20 | 0.20 | 0.20 | 0.20 | 0.20 |
| Polyamide thickener | 3.82 | 3.94 | 3.94 | 4.04 | 4.00 | 4.02 |
| Solid lubricant PTFE-wax mix | 6.06 | 6.10 | 2.80 | 1.36 | 1.40 | 0.54 |
| Wax | 0.87 | 0 | 0.90 | 0.91 | 1.49 | 0.88 |
| Total | 100 | 100 | 100 | 100 | 100 | 100 |

On the fastener tester (Schatz test machine) bolts of class 8.8 were pre-tensioned with 26 kN and bolts of class 10.9 were pre-tensioned with 38 kN.

TABLE 3c

| Formulation | Coating Thickness (μm) | Bolt Type | $COF_{tot}$ | $COF_{thread}$ | $COF_{head}$ |
|---|---|---|---|---|---|
| 10 | 7.9 | 8.8 | 0.098 (0.015) | 0.120 (0.030) | 0.085 (0.025) |
| 10 | 7.0 | 8.8 | 0.127 (0.037) | 0.143 (0.055) | 0.118 (0.033) |
| 10 | 10.3 | 10.9 | 0.103 (0.019) | 0.137 (0.021) | 0.085 (0.027) |
| 9 | 6.7 | 8.8 | 0.110 (0.032) | 0.124 (0.066) | 0.102 (0.032) |
| 11 | 5.6 | 8.8 | 0.119 (0.029) | 0.135 (0.067) | 0.110 (0.040) |
| 12 | 8.6 | 10.9 | 0.115 (0.025) | 0.148 (0.034) | 0.097 (0.039) |
| 12 | 8.1 | 10.9 | 0.097 (0.044) | 0.143 (0.059) | 0.073 (0.037) |
| 12 | 8.8 | 10.9 | 0.102 (0.050) | 0.138 (0.073) | 0.083 (0.048) |
| 12 | 6.2 | 10.9 | 0.111 (0.046) | 0.140 (0.094) | 0.096 (0.047) |
| 12 | 8.1 | 8.8 | 0.126 (0.046) | 0.150 (0.064) | 0.122 (0.049) |
| 13 | 8.3 | 10.9 | 0.092 (0.032) | 0.125 (0.057) | 0.075 (0.046) |
| 13 | 9.4 | 10.9 | 0.085 (0.034) | 0.109 (0.063) | 0.073 (0.038) |
| 14 | 8.1 | 10.9 | 0.128 (0.056) | 0.148 (0.073) | 0.117 (0.060) |
| 7 | 9.0 | 10.9 | 0.141 (0.070) | 0.167 (0.088) | 0.128 (0.074) |
| 6 |  | 10.9 | 0.138 (0.044) | 0.152 (0.062) | 0.131 (0.056) |
| 8 |  | 10.9 | 0.138 (0.022) | 0.185 (0.031) | 0.114 (0.039) |

Again, the values in Table 3c for COF are mean values from ten samples unbracketed values and scatter values (in brackets), whereas each bolt sample was tightened three times consecutively; the statistical values were calculated considering each of the three consecutive tightening for each bolt (this means: for ten bolts the mean and scatter values are statistically calculated 30 measured COF-values).

Some formulations were also tested for high strength bolts of class 12.9 as depicted in Table 3d. These were welding nuts pre-tensioned with 47 kN. Data refer to mean values and Δ-range of 10 bolts tested, each of them tightened for one time.

TABLE 3d

| Formulation | Coating Weight (g/bolt) | Bolt Type | $COF_{tot}$ | $COF_{thread}$ | $COF_{head}$ |
|---|---|---|---|---|---|
| 10 | 0.047 | 12.9 | 0.088 (0.015) | 0.088 (0.016) | 0.088 (0.021) |
| 12 | 0.045 | 12.9 | 0.119 (0.020) | 0.118 (0.035) | 0.118 (0.013) |

Note: it was not possible to measure the film thickness on this type of bolt as the shaft does not have a plane surface, but a full thread along the whole shaft; we controlled the thickness by measuring the coat weight.

Corrosion resistance was also tested and the results are depicted in in Table 3e.

TABLE 3e

| Formulation | Viscosity [s] | Coat Thickness (μm) | Corrosion - after 16 hrs (on thread/on head) | Corrosion - after 16 hrs (on thread/on head) after tumbling |
|---|---|---|---|---|
| 8 | 34 | 6.6 | 4.0/0.6 | 4.0/3.0 |
| 6 | 42 | 8.3 | 1.3/0.0 | 4.0/3.0 |
| 7 | 35 | 7.0 | 3.0/2.4 |  |
| 12 | 42 | 5.1 | 1.1/0.8 | 1.8/2.2 |
| 12 | 38 | 8.6 | 1.1/0.8 |  |
| 13 | 33 | 8.3 | 1.1/0.8 |  |
| 14 | 37 | 5.8 | 2.0/1.6 |  |
| 11 | 39 | 5.6 | 1.2/0.9 |  |
| 9 | 30 | 6.7 | 3.0/2.0 |  |
| 10 | 36 | 7.9 | 1.3/1.5 |  |

EXAMPLE 4

The results depicted in Table 3c above can be seen to have showed that several of the coatings therein resulted in too large a scatter of coefficient of friction on threads. In order to try and decrease the level of scatter a selection of silanes were introduced into the composition and compared to see if their presence resulted in a reduction of scatter. The compositions tested are indicated in Table 4a.

TABLE 4a

|  | Formulation | | | | | | |
| --- | --- | --- | --- | --- | --- | --- | --- |
|  | 15 | 16 | 17 | 18 | 19 | 20 | 21 |
| Butylacetate | 55.53 | 55.53 | 54.72 | 54.72 | 55.53 | 55.53 | 55.53 |
| n-butanol | 15.70 | 15.70 | 15.47 | 15.47 | 15.70 | 15.70 | 15.70 |
| Epoxy resin | 13.17 | 13.17 | 12.98 | 12.98 | 13.17 | 13.17 | 13.17 |
| Si-resin | 3.81 | 3.81 | 3.76 | 3.76 | 3.81 | 3.81 | 3.81 |
| Phenolic resin | 4.37 | 4.37 | 4.32 | 4.32 | 4.37 | 4.37 | 4.37 |
| Phosphoric acid | 0.20 | 0.20 | 0.20 | 0.20 | 0.20 | 0.20 | 0.20 |
| Polyamide thickener | 3.96 | 3.96 | 3.90 | 3.90 | 3.96 | 3.96 | 3.96 |
| Solid lubricant PTFE-wax mix | 1.35 | 1.35 | 2.77 | 2.77 | 1.35 | 1.35 | 1.35 |
| Wax | 0.90 | 0.90 | 0.89 | 0.89 | 0.90 | 0.90 | 0.90 |
| γ-aminopropyl triethoxysilane |  |  |  |  | 1.00 |  |  |
| 1,6-bis(trimethoxysilyl) hexane |  |  |  |  |  | 1.00 |  |
| (Ethylenediaminepropyl) trimethoxysilane |  |  |  |  |  |  | 1.00 |
| Methyltrimethoxysilane | 1.00 |  | 1.00 |  |  |  |  |
| Glycidoxypropyl-trimethoxysilane |  | 1.00 |  | 1.00 |  |  |  |
| Total | 100 | 100 | 100 | 100 | 100 | 100 | 100 |

Note: it was not possible to measure the film thickness on this type of bolt as the shaft does not have a plane surface, but a full thread along the whole shaft; we controlled the thickness by measuring the coat weight.

The compositions in Table 4a were also tested as previously described in respect to corrosion resistance and the results are depicted in Table 4d.

The formulations in Table 4a were then tested for coefficient of friction using the same methodology as previously described again using class 8.8 (26 kN) and 10.9 (38 kN) fasteners. The results are depicted in Table 4b:

TABLE 4b

| Formulation | Coating Thickness (μm) | Bolt Type | $COF_{tot}$ | $COF_{thread}$ | $COF_{head}$ |
| --- | --- | --- | --- | --- | --- |
| 17 | 8.4 | 8.8 | 0.112 (0.025) | 0.128 (0.038) | 0.130 (0.033) |
| 18 | 8.4 | 8.8 | 0.107 (0.024) | 0.118 (0.042) | 0.100 (0.033) |
| 19 | 8.4 | 8.8 | 0.124 (0.038) | 0.157 (0.058) | 0.106 (0.064) |
| 20 | 7.2 | 8.8 | 0.130 (0.067) | 0.150 (0.073) | 0.119 (0.065) |
| 21 | 10.6 | 8.8 | 0.118 (0.028) | 0.149 (0.062) | 0.101 (0.057) |
| 15 | 8.9 | 8.8 | 0.133 (0.040) | 0.149 (0.039) | 0.123 (0.055) |
| 16 | 7.0 | 8.8 | 0.121 (0.025) | 0.133 (0.041) | 0.115 (0.042) |

Formulations 17 and 18 depicted in Table 4a were also tested with class 12.9 (47 kN) fasteners as depicted in Table 4c.

TABLE 4c

| Formulation | Coating Weight (g/bolt) | Bolt Type | $COF_{tot}$ | $COF_{thread}$ | $COF_{head}$ |
| --- | --- | --- | --- | --- | --- |
| 17 | 0.043 | 12.9 | 0.077 (0.012) | 0.073 (0.017) | 0.079 (0.010) |
| 18 | 0.043 | 12.9 | 0.079 (0.009) | 0.088 (0.029) | 0.074 (0.013) |

TABLE 4d

| Formulation | Viscosity [s] | Coat Thickness (µm) | Corrosion - after 16 hrs (on thread/on head) |
|---|---|---|---|
| 19 | 30 | 8.4 | 1.5/0.5 |
| 20 | 32.8 | 7.2 | 0.9/0.4 |
| 21 | 49/gel | 10.6 | 2.0/1.0 |
| 15 | 28 | 8.9 | 4.0/3.0 |
| 17 | 33 | 8.4 | 1.6/1.5 |
| 16 | 28 | 7.0 | 1.3/0.5 |
| 18 | 32 | 8.4 | 1.8/0.6 |

Overall it was determined that methyltrimethoxysilane and glycidoxypropyltrimethoxysilane were the best silanes to introduce into the composition in order to reduce the scatter previously seen.

EXAMPLE 5

In this example a series of pigments are introduced into compositions of the type previously described. These appear to also assist identifying compositions which meet the product requirement profile (PRP) for engine fasteners.

The pigments utilized in example 5 were:
(i) calcium fluoride lubricant grade (D50=15 µm) supplied by Solvay Fluor GmbH and identified in the Table 5a as Caf2-LG
(ii) Calcium fluoride superfine (D50=11 µm) supplied by Solvay Fluor GmbH and identified in the Table 5a as CaF2-SF
(iii) Aeroxide Alu C 805 an Aluminium oxide product supplied by Degussa and identified in the Table 5a as Alu C 805.

The compositions tested are indicated in Table 5a.

TABLE 5a

| | Formulation | | | | | |
|---|---|---|---|---|---|---|
| | 22 | 23 | 24 | 25 | 26 | 27 |
| Butylacetate | 54.29 | 54.32 | 53.92 | 54.53 | 54.23 | 54.23 |
| n-butanol | 15.35 | 15.36 | 15.25 | 15.42 | 15.34 | 15.34 |
| Epoxy resin | 12.88 | 12.89 | 12.80 | 12.94 | 12.87 | 12.87 |

TABLE 5a-continued

| | Formulation | | | | | |
|---|---|---|---|---|---|---|
| | 22 | 23 | 24 | 25 | 26 | 27 |
| Si-resin | 3.73 | 3.73 | 3.70 | 3.74 | 3.72 | 3.72 |
| Phenolic resin | 4.28 | 4.27 | 4.24 | 4.30 | 4.27 | 4.27 |
| Phosphoric acid | 0.19 | 0.19 | 0.20 | 0.19 | 0.20 | 0.20 |
| Polyamide thickener | 3.91 | 3.87 | 3.84 | 3.90 | 3.87 | 3.87 |
| Solid lubricant PTFE-wax mix | 1.32 | 1.32 | 2.78 | 1.32 | 2.80 | 2.80 |
| Wax | 0.88 | 0.88 | — | 0.88 | — | — |
| Ca-F2-LG | 3.17 | — | — | — | — | — |
| Ca-F2-SF | — | 3.18 | 3.27 | — | — | — |
| Al$_2$O$_3$ | — | — | — | 2.77 | 2.70 | 2.70 |

The compositions in Table 5a were tested as previously described in respect to corrosion resistance. The formulations in Table 5a to were tested for coefficient of friction as depicted in Tables 5b using the same methodology as previously described again using class 8.8 (26 kN) and 10.9 (38 kN) fasteners. For both of the above type bolts, the film thickness of the cured coating is measured on the shaft of the bolt. Unfortunately 12.9 type bolts have a continuous thread along the shaft and as such the level of coat weight was indicated instead of coating thickness. The values for bolts 8.8 and 10.9 refer to values considering three consecutive tightenings of each tested bolt; for the bolt 12.9 data refer to one tightening.

TABLE 5b

| Formulation | Viscosity [s] | Coat Thickness (µm) | Corrosion - after 16 hrs (on thread/on head) |
|---|---|---|---|
| 22 | 33 | 7.7 | 0.3/0.2 |
| 23 | 30 | 7.4 | 0.3/0.2 |
| 24 | 29 | 6.2 | 2.0/2.0 |
| 25 | 46 | 10.0 | 0.4/0.4 |
| 26 | 42 | 9.6 | 1.6/0.8 |
| 27 | 43 | 7.4 | 2.3/1.0 |

The formulations in Table 5a were tested for coefficient of friction using the same methodology as previously described again using class 8.8 (26 kN) and 10.9 (38 kN) fasteners. The results are depicted in Table 5c:

TABLE 5c

| Formulation | Coating Thickness (µm) | Bolt Type | COF$_{tot}$ | COF$_{thread}$ | COF$_{head}$ |
|---|---|---|---|---|---|
| 24 | 6.2 | 8.8 | 0.116 (0.025) | 0.0127 (0.063) | 0.109 (0.034) |
| 26 | 9.6 | 8.8 | 0.115 (0.037) | 0.142 (0.072) | 0.101 (0.033) |
| 27 | 7.4 | 8.8 | 0.123 (0.019) | 0.140 (0.046) | 0.113 (0.029) |
| 22 | 7.7 | 8.8 | 0.125 (0.034) | 0.142 (0.051) | 0.115 (0.049) |
| 23 | 7.4 | 8.8 | 0.125 (0.035) | 0.143 (0.053) | 0.114 (0.048) |
| 25 | 10.0 | 8.8 | 0.121 (0.033) | 0.158 (0.051) | 0.100 (0.031) |

Formulations 24, 26 and 27 depicted in Table 5a were also tested with class 12.9 (47 kN) fasteners as depicted in Table 5d. The film thickness of the cured coating is typically measured on the shaft of the bolt. Unfortunately 12.9 type bolts have a continuous thread along the shaft and as such the level of coating was indicated. Therefore the coating is measure by coat weight as opposed to thickness.

TABLE 5d

| Formulation | Coating Weight (g/bolt) | Bolt Type | $COF_{tot}$ | $COF_{thread}$ | $COF_{head}$ |
|---|---|---|---|---|---|
| 24 | 0.043 | 12.9 | 0.081 (0.015) | 0.090 (0.024) | 0.076 (0.010) |
| 26 | 0.045 | 12.9 | 0.083 (0.022) | 0.083 (0.022) | 0.083 (0.023) |
| 27 | 0.045 | 12.9 | 0.087 (0.008) | 0.087 (0.008) | 0.088 (0.010) |

The pigments introduced in example 5 particularly support corrosion protection despite the fact that they are not considered to be anti-corrosion additives.

EXAMPLE 6

In this example a further series of pigments are introduced into compositions of the type previously described. These appear to also assist identifying compositions which meet the product requirement profile (PRP) for engine fasteners.

The pigments utilized in example 6 were:
(i) Melamine cyanurate a salt of melamine and iso-cyanuric acid in crystal form sold as Melapur® MC25 having a mean particle size (manufacturer's information) of 5 µm. This was found effective alone or in combination with a micronized amide wax (bis-stearyl-ethylenediamide) in a powder form (mean particle size (manufacturer's information) 6.5 µm which is manufactured by Clariant as Ceridust® 3910;
(ii) Polyamide-12 polymer in flake and/or sphere form with a mean particle size (manufacturer's information) of 5 µm sold as Nylon SP-500 which is manufactured by Toray Industries; and
(iii) Polyetheretherketone (PEEK) polymer in powder form with a mean particle size of Ketaspire® KT-820 from Solvay.

The compositions tested are indicated in Table 6a.

TABLE 6a

| | Formulation | | | | | |
|---|---|---|---|---|---|---|
| | 28 | 29 | 30 | 31 | 32 | 33 |
| Butylacetate | 57.89 | 57.00 | 58.34 | 57.89 | 58.56 | 58.94 |
| n-butanol | 16.40 | 16.15 | 16.53 | 16.41 | 16.59 | 16.72 |
| Epoxy resin | 10.60 | 10.43 | 10.67 | 10.59 | 10.72 | 10.78 |
| Si-resin | 3.07 | 3.02 | 3.09 | 3.07 | 3.10 | 3.12 |
| Phenolic resin | 3.52 | 3.40 | 3.59 | 3.52 | 3.60 | 3.66 |
| Phosphoric acid | 0.20 | 0.20 | 0.20 | 0.20 | 0.20 | 0.20 |
| Polyamide thickener | 3.24 | 3.09 | 3.23 | 3.23 | 3.27 | 3.32 |
| Solid lubricant PTFE-wax mix | 1.17 | 1.21 | 1.12 | 1.10 | 1.19 | 1.15 |
| Amide Wax | — | — | 0.83 | 1.62 | — | — |
| MCA | 2.92 | 4.51 | 1.41 | 1.39 | — | — |
| Nylon SP-500 | — | — | — | — | 1.76 | — |
| PEEK | — | — | — | — | — | 1.10 |
| Methyltrimethoxysilane | 1.00 | 1.00 | 1.00 | 1.00 | 1.00 | 1.00 |

The compositions in Table 6a were tested as previously described in respect to coefficient of friction and the results are depicted in Table 6b for compositions 28 and 29 (MCA), Table 6c for compositions 30 and 31 (MCA+Amide wax), Table 6d for composition 32 (Nylon SP-500) and Table 6e for composition 33 (PEEK).

TABLE 6b

| Formulation | Coating Thickness (µm) | Bolt Type | $COF_{tot}$ | $COF_{thread}$ | $COF_{head}$ |
|---|---|---|---|---|---|
| 28 | 5.6 | 8.8 | 0.126 (0.041) | 0.0146 (0.086) | 0.115 (0.029) |
| 29 | 7.7 | 8.8 | 0.134 (0.054) | 0.161 (0.096) | 0.120 (0.039) |
| 28 | 8.0 | 10.9 | 0.120 (0.049) | 0.159 (0.117) | 0.099 (0.022) |
| 29 | 10.8 | 10.9 | 0.125 (0.062) | 0.189 (0.107) | 0.092 (0.043) |
| 28 | 0.043 | 12.9 | 0.095 (0.012) | 0.104 (0.028) | 0.090 (0.013) |
| 29 | 0.047 | 12.9 | 0.108 (0.016) | 0.127 (0.035) | 0.096 (0.029) |

The formulations in Table 6a were tested for coefficient of friction as depicted in Tables 6b-6e using the same methodology as previously described again using class 8.8 (26 kN) and 10.9 (38 kN) fasteners. For both of the above type bolts, the film thickness of the cured coating is measured on the shaft of the bolt. Unfortunately 12.9 type bolts have a continuous thread along the shaft and as such the level of coat weight was indicated instead of coating thickness. The values for bolts 8.8 and 10.9 refer to values considering three consecutive tightenings of each tested bolt; for the bolt 12.9 data refer to one tightening.

Combinations of the MCA pigment in conjunction with amide type waxes were tested in Table 6c and it was found that this combination also gave good results. It will be seen that MCA alone and in combination with the micronized amide wax are able to increase the COF and also to reduce considerably the scatter on the underhead.

TABLE 6c

| Formulation | Coating Thickness (μm) | Bolt Type | $COF_{tot}$ | $COF_{thread}$ | $COF_{head}$ |
|---|---|---|---|---|---|
| 30 | 10.0 | 8.8 | 0.124 (0.038) | 0.135 (0.062) | 0.118 (0.032) |
| 31 | 6.4 | 8.8 | 0.118 (0.028) | 0.136 (0.063) | 0.108 (0.017) |
| 30 | 10.1 | 10.9 | 0.115 (0.063) | 0.155 (0.112) | 0.095 (0.044) |
| 31 | 11.8 | 10.9 | 0.120 (0.052) | 0.190 (0.123) | 0.083 (0.025) |
| 30 | 0.046 | 12.9 | 0.089 (0.021) | 0.092 (0.013) | 0.087 (0.036) |
| 31 | 0.050 | 12.9 | 0.091 (0.009) | 0.098 (0.033) | 0.087 (0.006) |

In the case of Table 6d the pigments were replaced by an alternative pigment Nylon SP-500.

TABLE 6d

| Formulation | Coating Thickness (μm) | Bolt Type | $COF_{tot}$ | $COF_{thread}$ | $COF_{head}$ |
|---|---|---|---|---|---|
| 32 | 7.0 | 8.8 | 0.127 (0.055) | 0.146 (0.093) | 0.117 (0.033) |
| 32 | 11.1 | 10.9 | 0.122 (0.055) | 0.163 (0.149) | 0.101 (0.027) |
| 32 | 0.042 | 12.9 | 0.090 (0.010) | 0.088 (0.012) | 0.092 (0.012) |

Again good results were obtained with a general increase in the COF as well as scatter reduction, particularly on the underhead.

Similarly In the case of Table 6e the pigment was replaced by a further alternative pigment PEEK polymer powder.

TABLE 6e

| Formulation | Coating Thickness (μm) | Bolt Type | $COF_{tot}$ | $COF_{thread}$ | $COF_{head}$ |
|---|---|---|---|---|---|
| 33 | 6.3 | 8.8 | 0.133 (0.030) | 0.148 (0.064) | 0.125 (0.026) |
| 33 | 13.9 | 10.9 | 0.128 (0.057) | 0.171 (0.107) | 0.106 (0.042) |
| 33 | 0.054 | 12.9 | 0.110 (0.086) | 0.128 (0.129) | 0.100 (0.062) |
| 33 | 0.054 | 12.9 | 0.089 (0.023) | 0.098 (0.017) | 0.084 (0.032) |

Again it can be seen that good results were achieved. Again good results were obtained with a general increase in the COF as well as scatter reduction, particularly on the underhead.

EXAMPLE 7

In this example a Titanium dioxide ($TiO_2$) pigment was introduced into the composition as a replacement for the other pigments utilised in Examples 5 and 6.

The formulations in Table 7a to were tested for coefficient of friction as depicted in Table 7b using the same methodology as previously described again using class 8.8 (26 kN) and 10.9 (38 kN) fasteners. For both of the above type bolts, the film thickness of the cured coating is measured on the shaft of the bolt. Unfortunately 12.9 type bolts have a continuous thread along the shaft and as such the level of coat weight was indicated instead of coating thickness. The values for bolts 8.8 and 10.9 refer to values considering three consecutive tightenings of each tested bolt; for the bolt 12.9 data refer to one tightening (indicated with 1 T) and three tightenings (indicated with 3 T). The specific pigment used was a titanium dioxide having a primary mean particle size of 10 nm. The product used is produced under the Trade Mark Hombitec® RM400 by Sachtleben Chemie GmbH, in powder form.

The compositions tested are indicated in Table 7a.

TABLE 7a

| | Formulation | |
|---|---|---|
| | 34 | 35 |
| Butylacetate | 55.35 | 56.86 |
| n-butanol | 15.64 | 16.07 |
| Epoxy resin | 10.06 | 10.34 |
| Si-resin | 2.91 | 2.99 |
| Phenolic resin | 3.36 | 3.05 |
| Phosphoric acid | 0.19 | 0.20 |
| Polyamide thickener | 3.03 | 2.85 |
| Solid lubricant PTFE-wax mix | 2.33 | 2.41 |
| hydrocarbon wax | 0.78 | 0.80 |
| $TiO_2$ (Hombitec ® RM400) | 5.37 | 3.45 |
| Methyltrimethoxysilane | 0.96 | 0.99 |

TABLE 7b

| Formulation | Coating Thickness (μm) | Bolt Type | $COF_{tot}$ | $COF_{thread}$ | $COF_{head}$ |
|---|---|---|---|---|---|
| 35 | 7.7 | 8.8 | 0.109 (0.019) | 0.108 (0.023) | 0.109 (0.034) |
| 34 | 12.9 | 8.8 | 0.111 (0.022) | 0.125 (0.030) | 0.103 (0.029) |
| 35 | 11.7 | 10.9 | 0.089 (0.018) | 0.109 (0.049) | 0.079 (0.029) |
| 34 | 15.9 | 10.9 | 0.085 (0.028) | 0.115 (0.059) | 0.069 (0.017) |
| 35 | 0.044 | 12.9 - 3T | 0.099 (0.069) | 0.086 (0.075) | 0.107 (0.071) |
| 35 | 0.044 | 12.9 - 1T | 0.086 (0.022) | 0.081 (0.015) | 0.088 (0.026) |
| 34 | 0.054 | 12.9 - 3T | 0.084 (0.038) | 0.071 (0.035) | 0.091 (0.052) |
| 34 | 0.054 | 12.9 - 1T | 0.076 (0.019) | 0.072 (0.014) | 0.079 (0.024) |

In Table 7b 1 T means one tightening and 3 T means 3 tightenings. The $TiO_2$ results in Table 7b results are showing, that this pigment had a favourable influence on the coefficient of friction (COF) and scatter in particular on threads (see results of 12.9 bolts and three tightenings).

The invention claimed is:

1. An antifriction coating composition comprising:
   (i) a resin binder;
   (ii) a polyamide thickener;
   (iii) a solvent; and
   (iv) a solid lubricant;
   wherein the resin binder (i) comprises a mixture comprising 15 to 50% by weight of a phenolic resin, 50 to 85% by weight of an epoxy resin and 10 to 30% by weight of a silicone resin, each based on 100% by weight of the (i) resin binder.

2. The antifriction coating composition in accordance with claim 1, wherein the resin binder (i) comprises the reaction product of a phenol ether resin, a diglycidyl ether of Bisphenol A and optionally, a polyorganosiloxane resin comprising at least two different units chosen from those of formulae $R_3SiO_{0.5}$ (M units), $R_2SiO_{2/2}$ (D units), $RSiO_{3/2}$ (T units) and $SiO_{4/2}$ (Q units), with at least one of these units being a T unit or a Q unit.

3. The antifriction coating composition in accordance with claim 2, wherein the resin binder (i) comprises the reaction product of the polyorganosiloxane resin and the polyorganosiloxane resin is a T resin, a DT resin or a MDT resin.

4. The antifriction coating composition in accordance with claim 1, wherein the polyamide thickener (ii) is a polyamide wax.

5. The antifriction coating composition in accordance with claim 4, wherein the polyamide wax comprises the reaction product of a long-chain carboxylic acid and mono functional amines, polyfunctional amines, or ammonia.

6. The antifriction coating composition in accordance with claim 4, wherein the polyamide wax comprises the reaction product of one or more alkylenediamines and one or more linear fatty acids or mixtures of fatty acids.

7. The antifriction coating composition in accordance with claim 1, wherein the solid lubricant (iv) is selected from the group of graphite, molybdenum disulfide ($MoS_2$), polytetrafluoroethylene (PTFE), a silicone wax, a solid hydrocarbon wax, a mixture of PTFE and polyolefin wax, zinc sulphide, tricalcium phosphate, calcium fluoride, and mixtures thereof.

8. The antifriction coating composition in accordance with claim 1, wherein the solvent (iii) is selected from the group of water, alcohols, ketones, esters, heterocyclic aromatic solvents, non-heterocyclic aromatic solvents, and mixtures thereof.

9. The antifriction coating composition in accordance with claim 8, wherein the solvent (iii) is a mixture of one or more alcohols and one or more esters, in a ratio of from 10:90 by weight to 50:50 by weight.

10. The antifriction coating composition in accordance with claim 1, further comprising: (v) one or more silane coupling agents.

11. The antifriction coating composition in accordance with claim 10, wherein the silane coupling agent (v) is selected from the group of methyltrimethoxysilane, (3-glycidoxypropyl) trimethoxysilane, (3-glycidoxypropyl) triethoxysilane, and mixtures thereof.

12. The antifriction coating composition in accordance with claim 1, comprising:
   (i) 15 to 30% by weight of the resin binder;
   (ii) 1 to 8% by weight of the polyamide thickener;
   (iii) 50 to 80% by weight of the solvent;
   (iv) 0.5 to 15% by weight of the solid lubricant;
   (v) 0 to 3% by weight of a silane coupling agent; and optionally,
   (vi) an additive;
   each based on 100% by weight of the total antifriction coating composition components.

13. The antifriction coating composition in accordance with claim 1, further comprising: one or more pigments.

14. The antifriction coating composition in accordance with claim 13, wherein the pigment comprises calcium fluoride and/or aluminium oxide.

15. A method of forming an antifriction coating on a substrate, the method comprising the step of:
   applying an antifriction coating composition to a surface of the substrate to form a coating;
   wherein the antifriction coating composition is in accordance with claim 1 and optionally, wherein the antifriction coating composition is applied by brushing, dipping, dip-spinning, spraying, printing, and/or roller coating.

16. The method in accordance with claim 15, further comprising the step of: curing the coating at a temperature of between 120° C. and 200° C. after application, and optionally, wherein the coating has a thickness of between 3 μm and 25 μm.

17. The method in accordance with claim 15, wherein the substrate is:
   I) pre-treated or post-treated with phosphating layers, Zn-rich coatings, Zn-flakes base coats, Zn-plating layers, or hot dip Zn-galvanizing layers;

II) selected from the group of fasteners or threaded connections used in industrial applications, fasteners used in automotive applications, door, bonnet and boot lock parts, hinges, door stoppers, window guides, seat belt components, brake rotors and drums, bushings, rods, piston skirts, piston rings or instrument panels; or III) both I) and II).

18. A coated substrate formed in accordance with the method of claim 16.

* * * * *